(12) United States Patent
Micheau

(10) Patent No.: US 12,049,984 B2
(45) Date of Patent: Jul. 30, 2024

(54) DEVICE AND METHOD FOR LUBRICATING DYNAMIC INSTRUMENT HOLDERS

(71) Applicant: Christophe Micheau, Castres (FR)

(72) Inventor: Christophe Micheau, Castres (FR)

( * ) Notice: Subject to any disclaimer, the term of this patent is extended or adjusted under 35 U.S.C. 154(b) by 994 days.

(21) Appl. No.: 16/977,840

(22) PCT Filed: Mar. 12, 2019

(86) PCT No.: PCT/FR2019/050527
§ 371 (c)(1),
(2) Date: Sep. 3, 2020

(87) PCT Pub. No.: WO2019/175496
PCT Pub. Date: Sep. 19, 2019

(65) Prior Publication Data
US 2021/0025548 A1    Jan. 28, 2021

(30) Foreign Application Priority Data

Mar. 12, 2018 (FR) ..................... 1852105

(51) Int. Cl.
*B65B 3/04* (2006.01)
*A61C 1/18* (2006.01)
(Continued)

(52) U.S. Cl.
CPC .................. *F16N 3/06* (2013.01); *B65B 3/04* (2013.01); *B65B 55/02* (2013.01); *B65D 35/10* (2013.01); *F16N 19/00* (2013.01); *A61C 1/181* (2013.01)

(58) Field of Classification Search
CPC ......... F16N 19/00; B65B 35/10; B65B 55/02; A61C 19/002
See application file for complete search history.

(56) References Cited

U.S. PATENT DOCUMENTS 2,654,948 A * 10/1953 Rubin ................... B65D 35/24
433/226
4,551,135 A * 11/1985 Gorman ............. A61B 17/8816
606/76
(Continued)

FOREIGN PATENT DOCUMENTS

CH            402530 A    11/1965
FR         2453351 A1    10/1980
(Continued)

OTHER PUBLICATIONS

International Search Report in corresponding International Patent Application No. PCT/FR2019/050527 mailed Sep. 19, 2019. 4 pages.

*Primary Examiner* — Michael R Mansen
*Assistant Examiner* — Mark K Buse
(74) *Attorney, Agent, or Firm* — Leason Ellis LLP

(57) ABSTRACT

The invention relates to a device for lubricating a dynamic instrument holder (300), characterized in that it comprises a disposable lubricating set including: a container (100) containing a pre-dosed quantity of lubricant, said quantity corresponding to the quantity required for the lubrication of a single dynamic instrument holder (300); and a tubular end piece (200) preformed with a communicating hollow core (230) and comprising two ends, the first end (210) of said end piece (200) attaching to an open end of said dynamic instrument holder (300) in such a way as to allow the flow of a lubricant to the dynamic instrument holder (300), and the container being connected to the second end (220). The invention also relates to a method for lubricating dynamic instrument holders. The invention is applicable to the lubrication of surgical tools such as dynamic instrument holders.

11 Claims, 5 Drawing Sheets

(51) Int. Cl.
*B65B 55/02* (2006.01)
*B65D 35/10* (2006.01)
*F16N 3/06* (2006.01)
*F16N 19/00* (2006.01)

(56) References Cited

U.S. PATENT DOCUMENTS

| | | | | |
|---|---|---|---|---|
| 5,131,845 | A * | 7/1992 | Feldman | A61C 1/181 |
| | | | | 433/104 |
| 5,520,882 | A * | 5/1996 | Brown | A61L 2/07 |
| | | | | 422/26 |
| 5,860,806 | A * | 1/1999 | Pranitis, Jr. | A61C 5/60 |
| | | | | 433/80 |
| 6,592,280 | B2 * | 7/2003 | Petrich | A61C 5/62 |
| | | | | 401/126 |
| 2004/0152041 | A1 * | 8/2004 | Metzbower | A61C 5/66 |
| | | | | 433/90 |
| 2006/0271015 | A1 * | 11/2006 | Mantell | A61M 13/003 |
| | | | | 604/533 |
| 2007/0131713 | A1 * | 6/2007 | Hill | B65D 47/32 |
| | | | | 222/107 |

FOREIGN PATENT DOCUMENTS

| | | |
|---|---|---|
| JP | 2017094012 A | 6/2017 |
| WO | 0061032 A1 | 10/2000 |

* cited by examiner

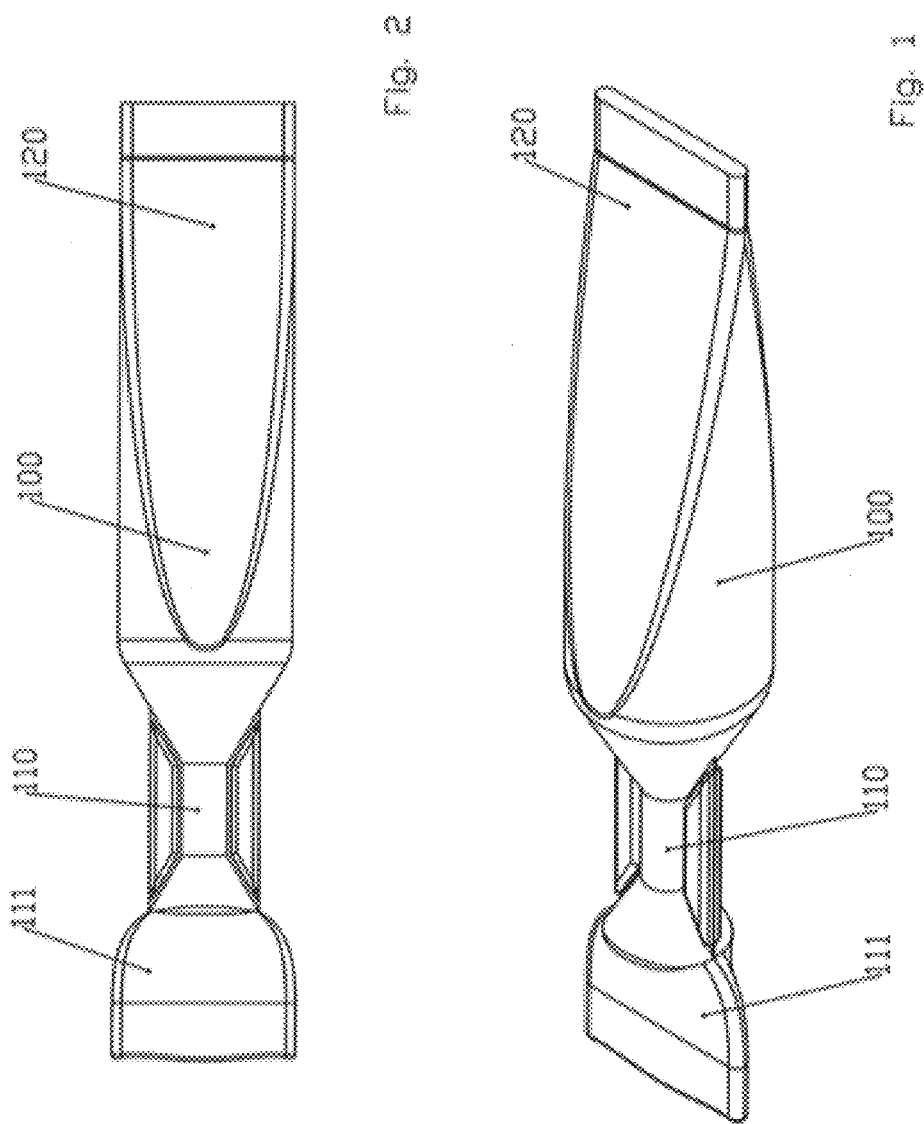

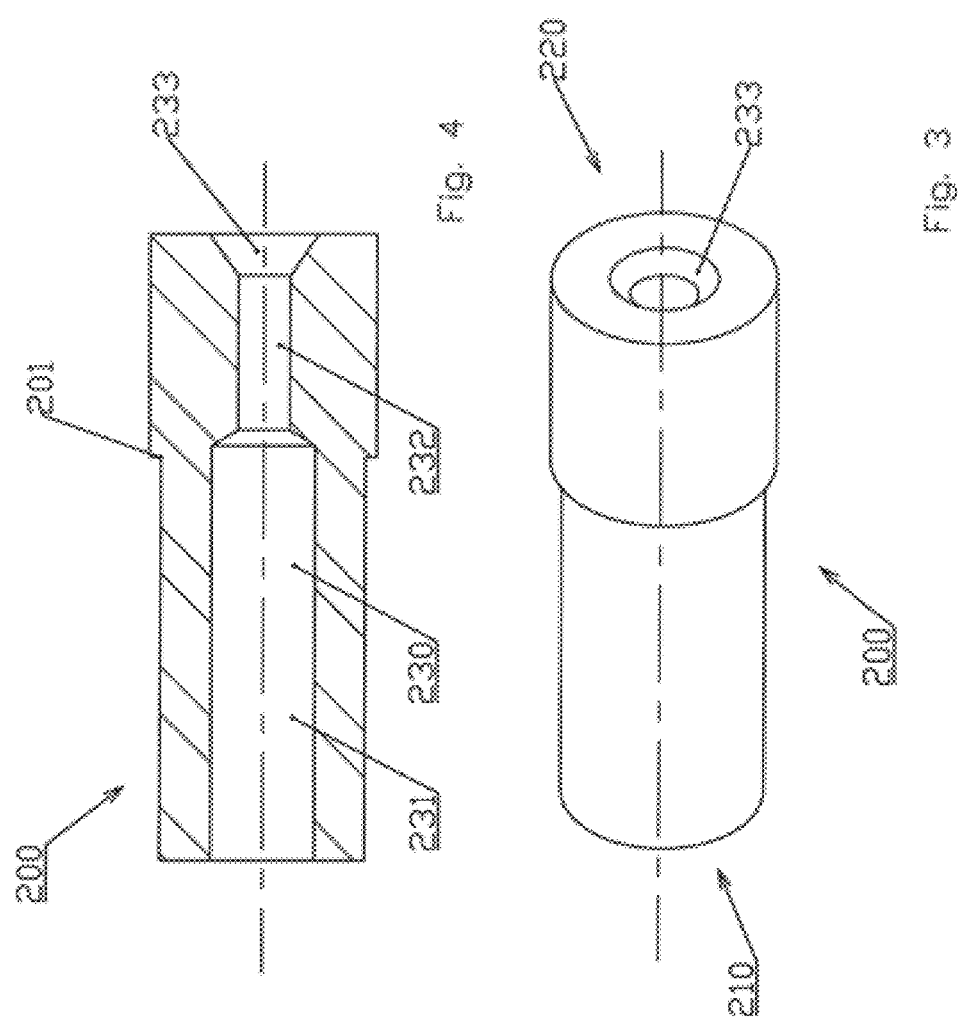

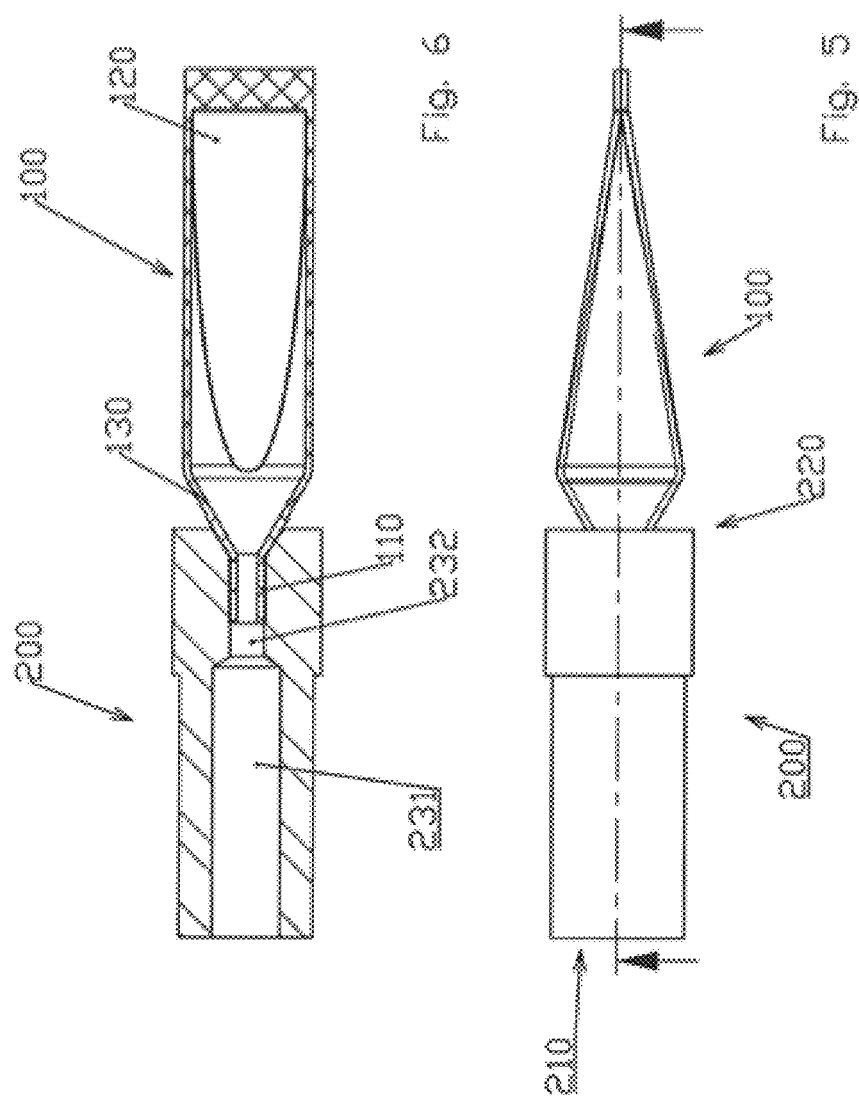

DEVICE AND METHOD FOR LUBRICATING DYNAMIC INSTRUMENT HOLDERS

CROSS-REFERENCE TO RELATED PATENT APPLICATIONS

This application is a U.S. National Stage Application under 35 U.S.C. § 371 of International Patent Application No. PCT/FR2019/050527, filed Mar. 12, 2019, which claims the benefit of priority of French Patent Application number 1852105 filed Mar. 12, 2018, both of which are incorporated by reference in their entireties. The International Application was published on Sep. 19, 2019, as International Publication No. WO 2019/175496 A1.

FIELD OF APPLICATION OF THE INVENTION

The present invention relates to mechanical medical devices used in the medical field known as dynamic instrument holders and, in particular, to adaptations for washing, drying, lubricating and sterilizing thereof in the best possible conditions.

DESCRIPTION OF PRIOR ART

Dynamic instrument holders, also called contra-angles or handpieces, are complex mechanical medical devices. These are all the devices which generate a movement (rotation, oscillation, etc.) of an instrument (bur, polisher, insert, etc.). An example of a dynamic instrument holder is the rotating tool holder known as a dental bur for oral surgery, but surgical handpieces are also dynamic instrument holders. In fact, the term 'dynamic instrument holder' includes any instrument with mobile elements used in the medical and/or surgical field.

These dynamic instrument holders must be properly washed, dried, lubricated and sterilized after each use.

The washing, drying and sterilization operations are necessary to meet the constraints of hygiene and non-contamination of the medical environment.

The lubrication operation is necessary for mechanical reasons in terms of operation and service life of the devices. However, the implementation of these operations has drawbacks.

In fact, the following two situations can be found.

A lubrication solution is used to lubricate and then sterilize the dynamic instrument holders. A non-sterile lubricant container, such as that described in document U.S. Pat. No. 5,131,845, is then used. In this case, the operation of sterilizers (steam autoclaves), which includes multiple vacuum phases, causes the lubricant to disappear completely. The dynamic instrument holder is no longer lubricated, which involves a risk of malfunction and premature aging.

Another solution is to sterilize and then lubricate the dynamic instrument holder. In this case, sterilization is no longer guaranteed because the lubrication device cannot be sterilized as it is currently designed. Indeed, as explained above, the oils used do not withstand the temperatures of known rapid sterilization processes. In addition, the use of a common lubricant container makes sterilization difficult between two lubrications. Furthermore, the quantity of lubricant is not controlled.

DESCRIPTION OF THE INVENTION

Starting from this prior art, the applicant carried out research aimed at being able to lubricate a dynamic instrument holder while ensuring that this step can be performed in sterile conditions.

This research led to the design and production of a device for lubricating a dynamic instrument holder characterized in that it includes a single-use lubricating set including:
- a removable container containing a pre-dosed quantity of lubricant, quantity corresponding to the quantity necessary for the lubrication of a single dynamic instrument holder,
- a preformed end piece of a communicating hollow core and comprising two ends,
- the first end of said end piece being attached to an open end of said dynamic instrument holder so as to allow the flow of the lubricant to the dynamic instrument holder,
- the container being connected to the second end.

The quantity of lubricant is dosed for a single use. The various subassemblies of the device of the invention are defined to be disposable.

For example, the dynamic instrument holder may be sterilized by autoclave while the lubricant, its container and the end piece may be subjected to a longer sterilization for a gentler handling of the lubricant.

Therefore, the sterilized dynamic instrument holder receives a sterile lubricant from sterile packaging. The lubricant is no longer subjected to destructive sterilization such as that subjected to the dynamic instrument holder. Lubrication is carried out after sterilization of the lubricant. The end piece serves as a mechanical interface and fluidic channel between the container and the dynamic instrument holder, guaranteeing the removable punctual attachment and sealing. Lubrication is thus optimized.

Another advantage of this device lies in the creation of a single dose of lubricant. Thus, the untrained user knows that they must fully utilize the pre-dosed amount of lubricant present in the container for a complete lubrication. In addition, they cannot use more than this dose. Thus, the device of the invention optimizes the lubrication by guaranteeing good lubrication without overconsumption of lubricant.

According to another particularly advantageous characteristic of the invention, the end piece and the container form a one-piece assembly ready to be attached to the open end of the dynamic instrument holder to be lubricated. A one-piece solution avoids the production and handling of two elements.

According to another particularly advantageous characteristic of the invention, said container is preformed with one end forming a neck and the second end of said end piece is preformed so that the end forming the neck of said container is fitted by friction into said end piece. This economical solution provides an easy point attachment guaranteeing the tightness of the connection. This solution is easy to manufacture and makes it possible to consider the same model of container for a plurality of end piece models (and, therefore, dynamic instrument holders).

More precisely, according to another particularly advantageous characteristic of the invention, the tubular end piece has a preformed hollow core including three adjacent coaxial hollow portions:
- a first hollow cylindrical portion of a first diameter starting from the first end, the diameter of which allows the end piece to fit into the rear end of the dynamic instrument holder,
- a second hollow cylindrical portion of a second diameter smaller than the first, allowing to receive and to retain by friction, once opened, the end forming the neck of the container, a third hollow frustoconical portion, flaring out toward the second end, allowing the end piece to center and receive the end of the container, which is preformed, under the neck of a frustoconical shape.

According to another particularly advantageous characteristic, the tubular end piece has a preformed hollow core including three adjacent coaxial hollow portions:
  a first hollow frustoconical portion of a first diameter, starting from the first end, allowing the end piece to fit into the rear end of the dynamic instrument holder and tapering inward up to a second diameter smaller than the first,
  a second hollow cylindrical portion, adopting said second diameter, making it possible to receive and retain by friction, once opened, the end forming the neck of the container,
  a third hollow frustoconical portion, flaring out toward the second end, allowing the end piece to center and receive the end of the container, which is preformed, under the neck of a frustoconical shape.

The third and second portions are dimensioned so that, once the container is installed in the end piece, the open end of the container opens into the first portion that allows the lubricant to be distributed more directly inside the dynamic instrument holders. In addition, by flaring out toward the first end, the third portion, which partially enters the dynamic instrument holder, facilitates the passage of the lubricant both inward and outward from the central axis that equips some dynamic instrument holders.

According to another particularly advantageous characteristic, the outer surface of the end piece of the first end has a frustoconical shape mounted to the open end of the dynamic instrument holder. The outer end of the end piece, cooperating with the dynamic instrument holder, tapers so that it universally adapts to several diameters of the opening of the dynamic instrument holders. This tapering also makes it possible to optimize the seal between the end piece and said dynamic instrument holder.

The material of the end piece was the subject of a study to optimize the bond of the end piece with the dynamic instrument holder as well as with the container, both in terms of friction and sealing.

According to a particularly advantageous characteristic of the invention, the end piece is made of polyethylene. According to a preferred but non-limiting embodiment, the polyethylene used is of the 5502 series.

According to another particularly advantageous characteristic, this polyethylene end piece is associated with a SEBS-type (thermoplastic elastomer) material. This association makes it possible to obtain a 50 Shore A hardness.

According to another particularly advantageous characteristic of the invention, said container forms a one-piece unit with its end forming the neck and cooperating with the end piece, the neck being sealed after filling.

According to another particularly advantageous characteristic of the invention, said container is preformed with a first widened neck having an externally and internally threaded cylindrical shape, the internal thread receiving a screwable sleeve forming a narrow neck preformed to cooperate with the end piece, the external thread receiving a screw cap. Such a configuration is advantageous in that it optimizes the closing of the single dose after filling despite the fact that the liquid is a lubricant.

According to a preferred embodiment, said container is made of plastic and, more particularly, of polyethylene.

According to another particularly advantageous characteristic of the invention, said container is flexible and contains a pre-dosed quantity of lubricant and air entering into the dynamic instrument holder under the pressure exerted by the user on the container walls. Displacing the fluid by pressure on the flexible walls is economical, reliable and avoids the use of an actuator. In addition, the presence of air creates a lubricant emulsion that facilitates penetration of the lubricant and ensures that the entire volume of lubricant is transferred into the body of the dynamic instrument holder.

Finally, the presence of air makes it possible to use a container of larger volume, easier to handle and easier to squeeze. Therefore, the presence of air makes it possible to have a more ergonomic container.

According to a preferred embodiment, the interior volume of the container is occupied to about 30% of liquid.

According to another particularly advantageous characteristic of the invention, the end forming the neck of the container that fits into said end piece is sealed and must be broken to be opened before it is fitted into the end piece. This rupture is carried out just before fitting in order to ensure the best possible aseptic conditions.

According to another particularly advantageous characteristic of the invention, the base of the end forming the neck of the container that fits into said end piece is preformed with a thread and closed by means of a cap screwed onto the thread. The cap is removed by unscrewing to allow fitting the neck in the end piece and the passage of the lubricant.

According to another characteristic, said container is preformed in a beveled shape tapering away from the end forming the neck. Such a shape facilitates the grasping and expulsion of the lubricant while ensuring that the entire volume of lubricant is expelled.

According to another particularly advantageous characteristic of the invention, the device comprises a first packaging receiving a container and an end piece, said first sealed packaging being received alone in a second, slightly larger sealed packaging. This is a double pocket system.

The single dose and the end piece are slipped together in a first package combining paper with polyethylene plastic which is sealed. This sub-assembly is slipped into a second larger package combining paper with polyethylene plastic which is sealed.

The assembly forming a packaged lubricating set is combined with other identical sets and is packaged in cardboard.

The three package rule is thus respected.

The second package is opened before entering the operating room. The first package is opened when lubrication is to be carried out. Placing together the lubricant container and the mechanical interface between the container and the dynamic instrument holder in the same packaging avoids having to manage and store two elements separately.

It will be understood that the device of the invention defines a new lubrication method which is also a subject matter of the invention.

According to the invention, the method for lubricating a dynamic instrument holder using the device described above is remarkable in that it includes the following operations:
  filling a flexible container with a lubricant and air,
  closure by means of a cap,
  placing said container and an end piece in a first packaging,
  sealing of the first package,
  placing the first sealed package in a second slightly larger package,
  sealing of the second package,
  packaging sterilization, opening of the second packaging (before the operating room in the case of use in the operating room),
opening of the first packaging (in the operating room),
opening of the container,
fitting of the open container into one end of the end piece,
fitting of the second end of the end piece into the rear end of the dynamic instrument holder,
pressing on the container by the user until completely empty.

This method makes it possible to have sterilized sub-assemblies (i.e. a sterile lubricating set) to lubricate a sterilized dynamic instrument holder. Asepsis and lubrication are thus optimized. This packaging principle by double packaging of sterile lubrication sets is new.

While the dynamic instrument holder can be sterilized in an autoclave, according to another particularly advantageous characteristic of the invention, the sterilization of the packaging is carried out by gamma irradiation process. This sterilization process is a low temperature process respecting the lubricant which can thus keep all its characteristics.

According to another particularly advantageous characteristic, the second packages containing the first packages are arranged in lots in cartons, the whole being sterilized. These three successive packages make it possible to meet the latest standards for aseptic preparation.

According to a particularly advantageous characteristic, said lubricant is a white oil. This oil accepts gamma irradiation sterilization without its properties being altered.

In addition, the end piece and the container, but also the packaging (first and second) are made of polyethylene accepting this type of radiation for sterilization purposes.

The fundamental concepts of the invention having been set out above in their most basic form, other details and characteristic will emerge more clearly on reading the following specification and referring to the accompanying drawings, several embodiments of a lubrication device according to the invention being described therein by way of nonlimiting examples.

BRIEF DESCRIPTION OF THE DRAWINGS

FIG. 1 is a schematic drawing of an external perspective view of an embodiment of a container according to the invention;

FIG. 2 is a schematic drawing of an external side view of the container of FIG. 1;

FIG. 3 is a schematic drawing of an exterior perspective view of an embodiment of an end piece according to the invention;

FIG. 4 is a schematic drawing of a side sectional view of the end piece of FIG. 3;

FIG. 5 is a schematic drawing of an external view of the assembly of the container from which the breakable cap has been removed with the end piece;

FIG. 6 is a schematic drawing of a sectional view of the assembly of the container with the end piece;

DESCRIPTION OF THE PREFERRED EMBODIMENTS

Figure 7:
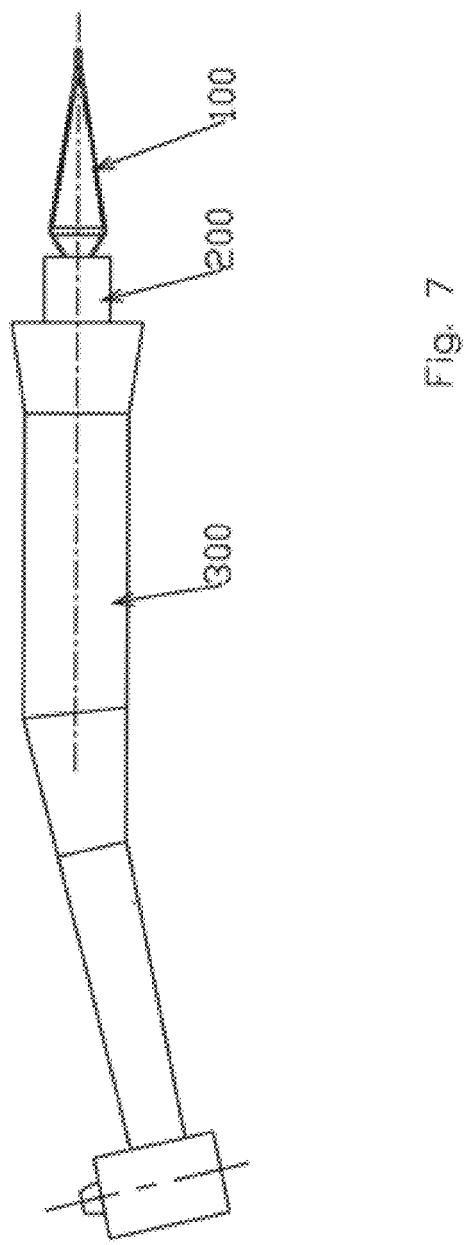
FIG. 7 is a schematic drawing of an external side view of an assembly of the container with the end piece installed on a dynamic instrument holder.

The lubricating device of the invention mainly comprises a container 100, illustrated alone in the drawings of FIGS. 1 and 2, and an end piece 200, illustrated alone in the drawings of FIGS. 3 and 4. Their fitting is illustrated by the drawings of FIGS. 5 and 6. Their installation on a dynamic instrument holder 300 for lubrication purposes is illustrated in the drawing of FIG. 7.

FIGS. 1 and 2 show a container 100 comprising a hollow body equipped at its front end with a frustoconical shape ending in a neck 110, and at its other end 120 with a beveled shape tapering toward the rear. The container 100 is made of a plastic material (here in polyethylene) and its neck 110 is closed after filling by means of a cap 111. The beveled shape facilitates the expulsion of the entire volume.

FIGS. 3 and 4 show an end piece 200 comprising a tubular body having an outer shoulder 201 made of polyethylene. This end piece 200 is preformed to be universal so that it can be inserted at a first end 210 in all dynamic instrument holders, all the handpieces and contra-angles used in dental surgery and to receive the open neck 110 of container 100 at a second end 220. The outer shoulder 201 makes it possible to differentiate the end 220 engaging with the container 100 from the end 210 engaging with the dynamic instrument holder 300 (see FIG. 7).

The hollow core 230 is preformed to include three adjacent hollow coaxial portions:
a first hollow cylindrical portion 231 of a first diameter starting from the first end 210, the diameter of which allows the end piece 200 to fit into the rear end of the dynamic instrument holder 300 (see FIG. 7),
a second hollow cylindrical portion 232 having a second diameter smaller than the first, making it possible to receive and retain by friction the open neck 110 of the container 100,
a third hollow frustoconical portion 233, flaring out toward the second end 220, allowing the end piece to center and receive the end of the container 100, which is preformed in a frustoconical shape, under the neck 110.

That friction also contributes to the tightness of the bond. The frustoconical shape facilitates the positioning of said neck.

As illustrated in the drawings of FIGS. 5 and 6, this friction and sealing are made possible by:
the tight fit created between the inner surface of the hollow cylinder 232 and the outer surface of the neck 110,
the concave frustoconical preformation (corresponding to the portion 233) for the end piece 200 and convex 130 for the container 100.

The material of the container 100 is flexible and contributes to the elasticity of the neck 110 which can be deformed to allow its introduction into the cylinder 231 and to retain the container 100 by friction in the end piece 200. The material of the end piece 200 is also flexible to facilitate insertions, frictional retention and sealing.

According to a preferred but non-limiting embodiment, the end piece 200 and the container 100 are made of polyethylene. The material of the end piece 200 is also combined with a SEBS-type thermoplastic elastomer in order to achieve a 50 Shore A hardness.

The length as well as the diameter of the hollow cylinder 231 is determined so as to allow its insertion onto the open end corresponding to the rear of the dynamic instrument holder 300, as illustrated in the drawing of FIG. 7. The outside diameter of the first end 210 of the end piece 200 is also defined to establish a tight friction bond with the end of the dynamic instrument holder. The dynamic instrument holder 300 is then ready to be lubricated.

In accordance with the invention, this dynamic instrument holder 300 has already been sterilized before the lubrication operation and the container 100 and its end piece 200 are removed from a sterile packaging (not shown).

The user ensures the breaking of the cap 111 in a sterile environment and fits the container 100 in the end piece 200, as illustrated in the drawing of FIG. 5.

The assembly is then fitted onto the open end of the dynamic instrument holder 300. The assembly is oriented in a vertical position with the dynamic instrument holder down and the container up. The user then presses the container 100 to move the lubricant into the dynamic instrument holder 300 through the end piece 200. Conventionally, the lubricant escapes through the lower end of the dynamic instrument holder 300. The latter is then sterile and lubricated, fully operational.

The end piece 200 and the container 100 are disposable and are therefore discarded after a single use.

Figure 10:
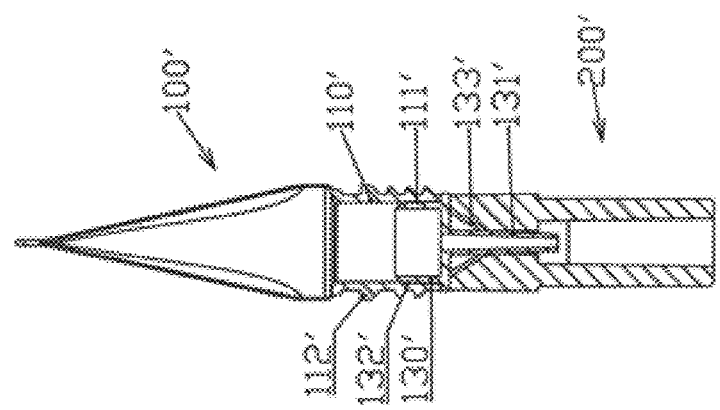
FIG. 10 is a schematic drawing of a sectional view of the container of FIG. 8 fitted onto the end piece of FIG. 9.
Figure 9:
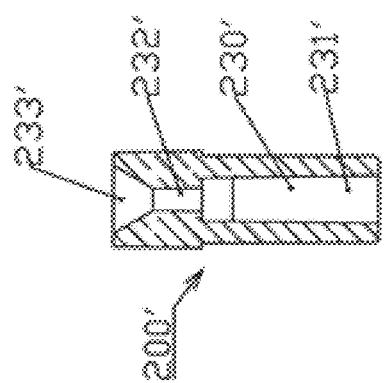
FIG. 9 is a schematic drawing of a sectional view of another embodiment of an end piece according to the invention.
Figure 8:
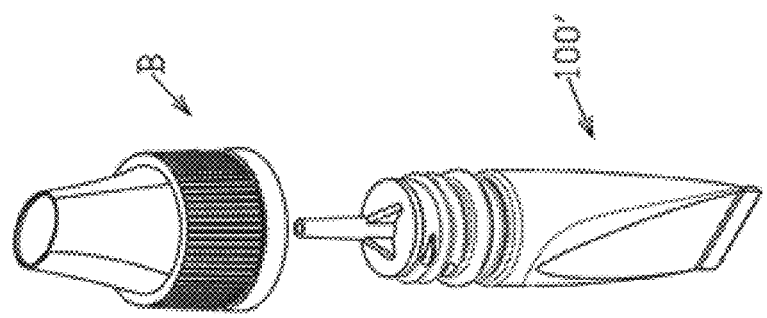
FIG. 8 is a schematic drawing of a side perspective view of another embodiment of a container according to the invention.

The drawings of FIGS. 8, 9 and 10 illustrate other embodiments, both for the container and for the end piece.

As illustrated by the drawing of FIG. 8, the container 100' is a container which is closed by means of a screw cap B.

As illustrated in more detail in the drawing of FIG. 10, said container 100' takes on the same rear shape as the container 100 but differs from the latter because of the screwing method used for closing the container 100' as well as for receiving a sleeve 130' which is screwed into the neck 110' and engages with the end piece 200'.

Therefore, this container 100' is preformed with a first widened neck 110' having an externally and internally threaded cylindrical shape. The internal thread 111' receives a screwable sleeve 130' forming, at a first end, a narrow neck 131' preformed to engage with the end piece 200' and, at a second end, an externally threaded cylinder 132'. The external thread 112' receives the screw cap B. Therefore, the narrow neck 131' remains smooth and can engage with the hollow core 230' of the end piece for wedging and maintaining the seal during the passage of the fluid from the container to the dynamic instrument holder.

As illustrated in the drawing of FIG. 9, the tubular end piece 200' has a hollow core 230' preformed to include three adjacent coaxial hollow portions:

a first hollow frustoconical portion 231' of a first diameter starting from the first end allowing the end piece 200' to fit into the rear end of the dynamic instrument holder and tapering toward the interior up to a second diameter smaller than the first, a second hollow cylindrical portion 232' adopting said second diameter, allowing to receive and retain by friction, once opened, the end 131' forming the neck of the container 100', a third hollow frustoconical portion 233', flaring out toward the second end, allowing the end piece 200' to center and receive the end of the container which is preformed in a frustoconical shape 133' under the neck 131'.

The outward flaring (or inward tapering) of the first portion 231' is illustrated but hardly visible because the taper angle is small.

Likewise, the outer surface does not take on the shape of a simple cylinder but that of two trunks of a cone so that the two outer ends of the end piece are tapered relative to the median part of the end piece. These conical shapes are hardly visible because the taper angle is small. The two ends of the end piece 200' are tapered, the one which engages with the container 100' to allow unmolding this plastic part, and the one which engages with the dynamic instrument holder so that it can adapt and provide a seal when fitted to different opening diameters of the dynamic instrument holder.

As illustrated in the drawing of FIG. 10, the open end 131' of the container 100' opens into the first portion 231'.

The first end of the end piece 200' is chamfered to facilitate its insertion into the dynamic instrument holder.

It will be understood that the device and the method, which were described and represented above, were for the purpose of disclosure rather than limitation. Various arrangements, modifications and improvements may obviously be made to the above example, without departing from the scope of the invention.

The invention claimed is:

1. A lubrication device for a dynamic instrument holder, comprises a sterile disposable lubricating set including:
   a container containing a pre-dosed quantity of sterile lubricant, said quantity corresponding to the quantity required for the lubrication of a single dynamic instrument holder,
   a tubular end piece preformed with a communicating hollow core and comprising a first end and a second end, wherein the tubular end piece is independent of the container,
   the first end of said end piece attaching to an open end of said dynamic instrument holder in such a way as to allow the flow of the lubricant to the dynamic instrument holder,
   the container being preformed with an end forming a neck and the second end of said end piece being preformed so that the end forming a neck of said container fits by friction into said end piece,
   wherein the tubular end piece has a hollow core preformed to include three adjacent coaxial hollow portions:
   a first hollow cylindrical portion of a first diameter starting from the first end, the diameter allowing the end piece to fit into the rear end of the dynamic instrument holder and tapering inwards up to a second diameter smaller than the first,
   a second hollow cylindrical portion, taking on said second diameter, allowing to receive and retain by friction, once opened, the end forming the neck of the container,
   a third hollow frustoconical portion, flaring out toward the second end, allowing the end piece to center and receive the end of the container, which is preformed, under the neck of a frustoconical shape.

2. The lubrication device according to claim 1, wherein said container is flexible and contains a pre-dosed quantity of lubricant and air entering into the dynamic instrument holder under the pressure exerted by the user on the walls of the container.

3. The lubrication device according to claim 1, wherein said container is preformed in a beveled shape tapering away from the end forming the neck.

4. The lubrication device according to claim 1, wherein the end piece is composed of a combination of polyethylene and a thermoplastic elastomer.

5. The lubrication device according to claim 1, wherein the lubricant is a white oil.

6. The lubrication device according to claim 1, wherein said container forms a one-piece assembly with its end forming the neck engaging with the end piece, the neck being sealed after filling.

7. The lubrication device according to claim 1, wherein the base of the end forming the neck of the container fitting into said end piece is preformed with an external thread, said end being closed by means of a cap screwed onto the thread.

8. The lubrication device according to claim 1, wherein the third and second portions are dimensioned so that once the container is installed in the end piece, the open end of the container opens into the first portion.

9. The lubrication device according to claim 1, wherein the outer surface of the end piece has a frustoconical shape for the first end attached to the open end of the dynamic instrument holder.

10. A lubrication device for a dynamic instrument holder, comprises a sterile disposable lubricating set including:
- a container containing a pre-dosed quantity of sterile lubricant, said quantity corresponding to the quantity required for the lubrication of a single dynamic instrument holder,
- a tubular end piece preformed with a communicating hollow core and comprising a first end and a second end, wherein the tubular end piece is independent of the container,
- the first end of said end piece attaching to an open end of said dynamic instrument holder in such a way as to allow the flow of the lubricant to the dynamic instrument holder,
- the container being preformed with an end forming a neck and the second end of said end piece being preformed, so that the end forming a neck of said container fits by friction into said end piece,
- wherein the tubular end piece has a hollow core preformed to include three adjacent coaxial hollow portions:
  - a first hollow cylindrical portion of a first diameter starting from the first end, the diameter of which allows the end piece to fit into the rear end of the dynamic instrument holder,
  - a second hollow cylindrical portion, of a second diameter smaller than the first, allowing to receive and retain by friction, once opened, the end forming the neck of the container,
  - a third hollow frustoconical portion, flaring out toward the second end, allowing the end piece to center and receive the end of the container which is preformed under the end forming the neck of a frustoconical shape.

11. A lubrication device for a dynamic instrument holder, comprises a sterile disposable lubricating set including:
- a container containing a pre-dosed quantity of sterile lubricant, said quantity corresponding to the quantity required for the lubrication of a single dynamic instrument holder,
- a tubular end piece preformed with a communicating hollow core and comprising a first end and a second end, wherein the tubular end piece is independent of the container,
- the first end of said end piece attaching to an open end of said dynamic instrument holder in such a way as to allow the flow of the lubricant to the dynamic instrument holder,
- the container being preformed with an end forming a neck and the second end of said end piece being preformed so that the end forming a neck of said container fits by friction into said end piece,
- wherein said container is preformed with a first widened neck having an externally and internally threaded cylindrical shape, the internal thread receiving a screwable sleeve forming a narrow neck preformed to engage with the end piece, the external thread receiving a screw cap.

\* \* \* \* \*